March 22, 1927.
W. N. MOORE
CASING PULLER
Filed July 30, 1926  2 Sheets-Sheet 1
1,621,947
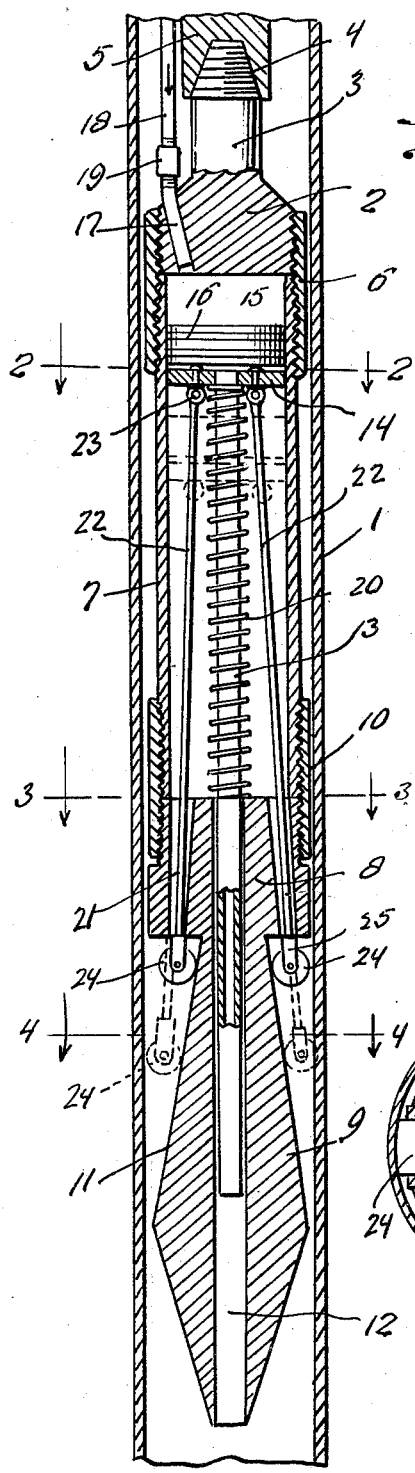
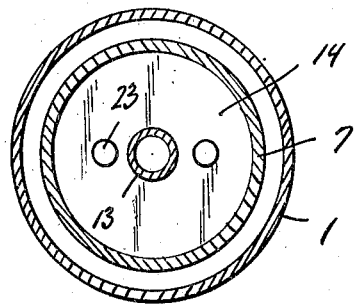
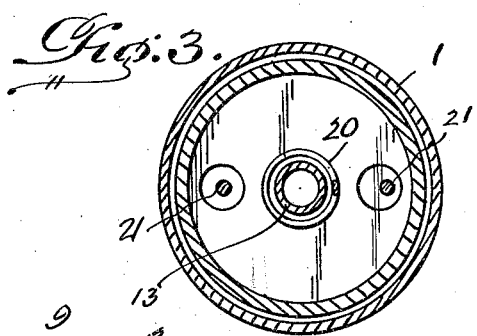
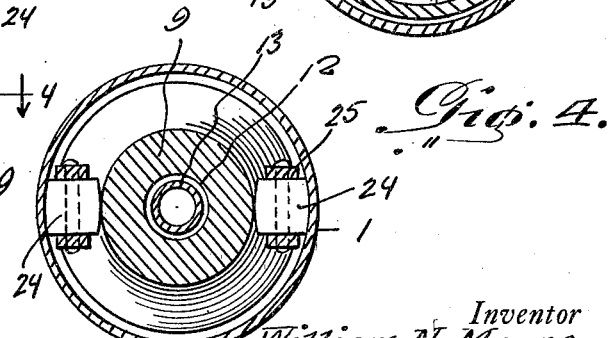
Inventor
William N. Moore,
By Clarence A. O'Brien
Attorney

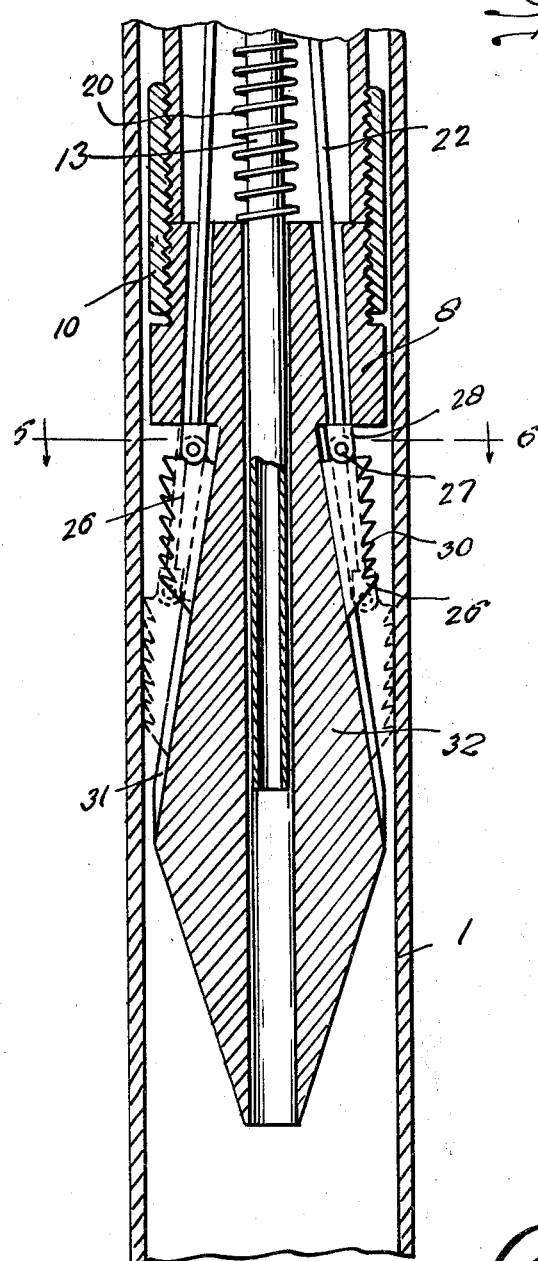
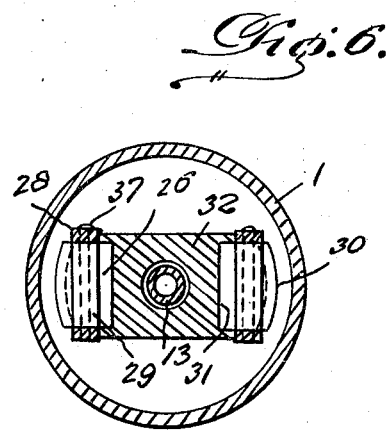
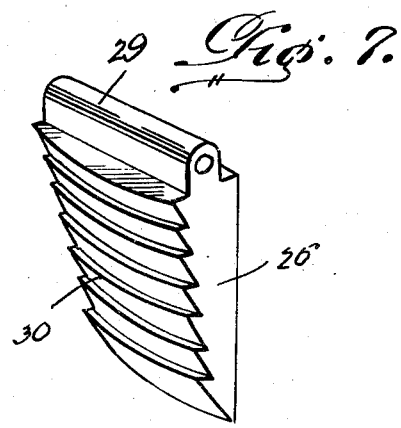

Patented Mar. 22, 1927.

1,621,947

UNITED STATES PATENT OFFICE.

WILLIAM N. MOORE, OF ABILENE, TEXAS.

CASING PULLER.

Application filed July 30, 1926. Serial No. 125,973.

The present invention relates to improvements in grapples, and has reference more particularly to a simple and efficient device for removing casings from oil wells.

One of the important objects of the present invention is to provide a casing puller which may be readily and easily inserted in the casing which is to be removed, suitable gripping means being associated with the puller for engagement with the inner wall of the casing whereby the casing is rigidly secured on the puller and thereby enabling the casing to be easily lifted upwardly from the well.

A further object of the invention is to provide a casing puller of the above mentioned character which will at all times be positive and efficient in its operation, the same being simple in construction, inexpensive, strong and durable and further well adapted to the purpose for which it is designed.

Other objects and advantages of the invention will become apparent during the course of the following description taken in connection with the accompanying drawings.

In the accompanying drawings forming a part of this application and in which like numerals indicate like parts:

Figure 1 is a vertical sectional view of the casing puller embodying my invention, showing the same disposed within a casing, the gripping rollers being shown in their normal inoperative position.

Figure 2 is a transverse section taken approximately on line 2—2 of Figure 1 looking in the direction of the arrows.

Figure 3 is a similar section taken on line 3—3 of Figure 1.

Figure 4 is a transverse section taken on line 4—4 of Figure 1 showing the manner in which the gripping rollers coact with the wedge shaped member and the inner wall of the casing.

Figure 5 is an enlarged fragmentary vertical section similar to Figure 1 showing the modification of the casing gripping means.

Figure 6 is a sectional view taken approximately on line 6—6 of Figure 5 looking in the direction of the arrows, and Figure 7 is a detail perspective view of one of the gripping dogs shown in the modification.

In the drawings wherein for the purpose of illustration is shown the preferred embodiment of my invention, the numeral 1 designates the casing which is to be removed from a well. My improved grapple comprises a head 2 having an upwardly extending shank 3, the upper end of which is tapered and externally threaded as at 4 for threaded engagement in a similar shaped threaded socket provided therefor in the lower end of a drill stem 5. The head 2 is externally threaded and is threaded into the upper end of an internally threaded coupling sleeve 6.

The casing puller further comprises the tubular body 7 and the upper end thereof is externally threaded and threaded into the coupling sleeve 6. The lower end of the tubular body member 7 is also externally threaded and adapted to be associated therewith is the block or head 8, the same being formed on the upper end of the wedge shaped member 9.

The upper portion of this head or block member 8 is externally threaded and a coupling sleeve 10 affords the connection between the lower end of the tubular body 7 and the upper portion of the head or block member 8 in the manner as clearly shown in Figure 1. The member 9 has its sides tapering gradually toward the head or block member 8 and the purpose of these tapering faces 11 will be hereinafter more fully described.

The head member 8 as well as the wedge 9 is provided with a central opening 12, and adapted for slidable movement therethrough is the elongated tube 13. A disc or plate 14 is provided with a central opening to fit over the upper end of the tube 13 and this disc or plate is secured on the upper end portion of the tube in any appropriate manner.

The disc or plate 14 cooperates with the bottom of the head 2 in forming a chamber 15 in the upper portion of the tubular body member or pipe 7. Adapted for reciprocatory movement within this chamber 15 is a floating piston 16, the same being provided in its peripheral face with the usual packing rings adapted for engagement with the inner wall of the upper portion of the tubular body member 7.

A steam inlet pipe 17 extends upwardly through the head 2, the lower end of said pipe being adapted for communication with the chamber 15, the upper end of this inlet pipe being threaded, and adapted for communication with a steam supply pipe 18 which extends downwardly in the casing 1 adjacent the drill stem 5. A suitable coupling 19 connects the adjacent ends of the inlet pipe with the steam supply pipe together as is shown clearly in Figure 1. It is of course to be understood that when steam is not emplyed in connection with the device, the pipe 18 may be disconnected. The steam is used in conjunction with the present invention when a cable operated rig is used in connection with the apparatus. When a rotary machine is employed for cooperation with the casing remover, water is to be used in the manner to be hereinafter more fully described.

An expansible coil spring 20 encircles the upper portion of the tube 13 and is disposed between the top of the head or block member 8 and the bottom face of the disc or plate 14 for normally holding the latter in its uppermost position in the tubular body or pipe 7.

Angularly disposed openings 21 are formed in the block or head member 8 and the same extends from the top to the bottom thereof in the manner as clearly shown in Figure 1. Adapted for slidable movement through these openings are the rods 22, the same being pivotally connected at their uper ends to the disc or plate 14 on opposite sides of the tube 13 as at 23.

In one form of the invention the gripping means comprises the rollers 24 which are mounted in suitable brackets 25, the same being secured on the lower ends of the respective rods 22. These rollers are below the head member 8 and are adapted to coact with the tapered faces 11 of the wedge shaped member 9 in gripping the casing 1 as is readily obvious from the construction shown in Figure 1. The rollers have their peripheries curved as shown more clearly in Figure 4 so that the same will conform with the shape of the casing in order to obtain a more rigid and efficient grip.

The operation of the casing puller above described may be briefly stated as follows: Normally the parts are arranged as shown in Figure 1 of the drawings. When steam is admitted to the chamber 15 through the pipes 18 and 17, the piston 16 will be moved downwardly, simultaneously causing the disc or plate 14 to travel downwardly in the tubular body or pipe 7 and as this disc or plate travels downwardly, the rods 22 will be forced downwardly through the openings 21 formed in the head or block member 8 and also causing the rollers 24 to move outwardly toward the inner wall of the casing due to the construction of the wedge shaped member 9 and when the parts are arranged as shown in the dotted lines, the rollers 24 will cooperate with the wedge shaped member 9 in rigidly gripping the casing 1, and by pulling upwardly on the drill stem 5, the casing will be easily and readily removed from the well. The coil spring 20 which encircles the tube 13 will return the movable parts to their normal positions when the steam is exhausted from the chamber 15.

In Figures 5, 6, and 7 of the drawings, I have shown a modification of the casing gripping means wherein the same comprises dogs 26 the same being pivotally secured at their upper ends to the lower ends of the vertically movable rods 22 by means of a pin 27 which extends transversely through the depending ears of a bracket 28 which is secured on the lower end of each rod and which pin further extends through the boss 29 formed at the top of each of the dogs. The outer face of each dog is provided with the transversely extending gripping teeth 30, the same being curved from one side of the dog to the other side thereof so as to conform more readily to the contour of the casing.

These dogs 26 are adapted for slidable movement within suitable guide ways 31 provided therefor in the opposed faces of the wedge shoped memer 32 in the manner as clearly shown in Figures 5 and 6.

When rotary machinery is used instead of cable machinery, disconnect Figure 1 by removing head 2 of Figure 1, also remove floating piston 16 and leave the coupling sleeve 6 so that as many joints of piping could be connected as would be needed to reach the top of the well then a great amount of water is rushed in, in order to make weight enough on disc or plate 14 to press the rollers 24 or dogs 26, down against the side walls of the casing 1 as shown at arrow 4—4. In order to give the same catch as if steam was used when the catch is made the flow of water is stopped so if it would be necessary to release for anything by that time the water would all be gone through the tube 13, therefore giving the spring 20 a chance to bring the rollers 24 or dogs 26, back to their natural position.

Water is only used on rotary rigs when they have no drill stems or cables to use.

It will thus be seen from the foregoing description, that I have provided a casing puller which may be readily and easily operated and which will furthermore at all times be positive and efficient in carrying out the purposes for which it is designed.

While I have shown the preferred embodiment of my invention it is to be understood that minor changes may be made in the invention without departing from the spirit of the invention and the scope of the appended claims.

Having thus described the invention, what I claim as new and desire to secure by Letters Patent is:—

1. A casing remover comprising a tubular body, a head at each end of the body, a wedge shaped member depending from the lower head, a disc adapted for vertical movement in the upper portion of the tubular body and cooperating with the upper head to provide a chamber therebetween, rods secured at their upper ends to the disc and extending downwardly through the lower head on opposite sides of the wedge shaped member, casing gripping elements carried by the lower ends of the rods, means for actuating the disc and said rods to move the gripping elements downwardly along said wedge shaped member into gripping relation with the inner wall of the casing, said means comprising a floating piston arranged in the aforementioned chamber and adapted to engage the top of the disc for moving the same downwardly under the action of fluid pressure.

2. A casing remover comprising a tubular body, a head carried by the lower end of said tubular body, said head being provided with a pair of diametrically opposed angular openings which extend from the top of the head to the bottom thereof, a wedge shaped member depending from said head, a disc adapted for vertical movement in the upper portion of the tubular member, a pair of rods pivotally secured at their upper ends to said disc and extending downwardly through the respective angular openings in said head, casing gripping elements carried by the lower ends of the rods, and means for actuating the disc and said rods to move the gripping elements downwardly along said wedge shaped member into gripping relation with the inner wall of the casing.

In testimony whereof I affix my signature.

WILLIAM N. MOORE.